United States Patent [19]

Lunde et al.

[11] Patent Number: 4,738,522

[45] Date of Patent: Apr. 19, 1988

[54] METHOD AND APPARATUS FOR COORDINATED SUPER IMPOSITION OF IMAGES IN A VISUAL DISPLAY

[75] Inventors: Montgomery Lunde, Mor Vista; Rockne Hall, Studio City; Peter Kelly, N. Hollywood, all of Calif.

[73] Assignee: Technifex, Sun Valley, Calif.

[21] Appl. No.: 883,112

[22] Filed: Jul. 8, 1986

[51] Int. Cl.$^4$ .............................................. G03B 21/26
[52] U.S. Cl. ....................................... 353/28; 353/30; 353/46
[58] Field of Search ....................... 353/10, 28, 30, 37, 353/46, 50; 272/8 P, 8 M, 8.5, 13; 350/144, 174, 169; 352/88, 89; 358/89, 97

[56] References Cited

U.S. PATENT DOCUMENTS

| | | | |
|---|---|---|---|
| 2,169,045 | 8/1939 | Haskin | 353/28 |
| 2,232,110 | 2/1941 | Gruenhut | 353/28 |
| 2,336,508 | 12/1943 | Smith et al. | 353/37 |
| 2,501,958 | 3/1950 | O'Brien | 353/28 X |
| 2,857,806 | 10/1958 | Shuftan | 352/89 |

FOREIGN PATENT DOCUMENTS

| | | | |
|---|---|---|---|
| 504445 | 7/1951 | Belgium | 352/89 |
| 19823 | of 1911 | United Kingdom | 353/30 |

Primary Examiner—Harry N. Haroian
Attorney, Agent, or Firm—Blakely, Sokoloff, Taylor & Zafman

[57] ABSTRACT

A method of combining projected images with a three dimensional set. In the present invention, a three dimensional set of any desired scale is provided. A second set is then built for use by live actors and other desired images to be incorporated into the three dimensional scene. Props are disposed on the second set and corresponds to the three dimensional scenes. These second set props are blacked out so that when photographed they are rendered invisible. A beam splitter is provided in front of the three dimensional set and a monitor is positioned to reflect a video image from the second set on to the beam splitter. The actors and props on the second set are then positioned to achieve the desired scale. For example, the projected image of the actor may be life size, smaller than life size or larger than life size. The actor is then filmed in real time interacting with the blacked out second set props and the image is recorded. The recorded image is then played back on the monitor reflected on to the beam splitter to give the illusion that the recorded image is interacting with the props in a three dimensional set. The live image may be transmitted directly to the monitor for projection on to the beam splitter without first recording it, if desired.

30 Claims, 7 Drawing Sheets

METHOD AND APPARATUS FOR COORDINATED SUPER IMPOSITION OF IMAGES IN A VISUAL DISPLAY

BACKGROUND OF THE INVENTION

1. Field of the Invention

This invention relates to the field of coordinated image combination and display.

2. Background Art

It is ofen desired to combine a projection of a recorded or live image with a three dimensional display image and present the combination as a single unified image. The combined image, when displayed, can be used to implement "special effects" as for example, causing a displayed image to dissappear by removing the recorded image from the combined image. In addition, it may be desired to have the recorded or live image interact with the three dimensional set display, further enhancing the impression of a single combined image. The three dimensional set may be of various sizes and scales, from minatures, to lifesize to larger scales.

There have been various methods of providing a recorded image with a three dimensional set. For example, in Rush, U.S. Pat. No. 3,707,115, apparatus is provided for producing a three dimensional diorama. A three dimensional reflective "screen" is prepared and details and coloring are added. A photograph is then taken of the screen from a fixed position. After removing the details and coloring, the photograph is projected onto the screen, creating the illusion of a dioramic display. For changes in the scene, new details are added and a new photograph is taken. By projecting the photographs in sequence on the three dimensional screen, a changing diorama can be achieved. The method of Rush as the disadvantage of requiring the projected images to be made from models at the same scale as the three dimensional set. For small sets, it if often difficult to achieve subtle detail without great expense or a large time commitment. In addition, the method of Rush requires animation or stop frame photography in order to show movement from scene to scene. There are no provisions for real time matting of set and recorded image or the use of life size models for providing the recorded images.

Egging, U.S. Pat. No. 4,306,768, discloses an apparatus for creating multiplanar images. Egging utilizes a computer generated image and displays it on a display screen, such as a TV monitor 8. A series of parallel mirrors are disposed at an angle to the monitor and act as beam splitters. The mirrors reflect the TV image and pass through images behind each mirror to the viewer. Egging provides three dimension models which are reflected to the viewer or viewed through the splitters to provide a combined image with a vido display. Egging does not provide for real time matting of video or live images with three dimensional sets, but, like Rush relies on animation techniques generated by a computer to provide a moving display. In addition, Egging does not provide for the use of life size scale three dimensional sets or larger scale sets. Finally, Egging requires the use of multiple beam splitters in order to achieve a sense of depth.

Accordingly, it is the object of the present invention to provide a method and apparatus for providing real time matting of a recorded or live image of any scale with a three dimensional set image of any scale.

It is a further object of the present invention to provide a method of combining recorded or live images with three dimensional image sets without the use of a three dimensional reflecting surface or screen.

It is yet another object of the present invention to provide a combined recorded or live image with a three dimensional set which gives the illusion of depth without requiring multiple viewing planes.

Other objects and attendant advantages will be apparent upon a reading of the specification and accompanying drawings.

SUMMARY OF THE PRESENT INVENTION

In the present invention, a three dimensional set of any desired scale is utilized. A second set is used by live actors and/or other desired images or objects to be incorporated into the three dimensional scene. Props disposed on the second set correspond to set pieces in the three dimensional scene. These second set props are blacked out such that they are rendered invisible when photographed. A beam splitter is provided in front of the three dimensional set and a monitor or projector is positioned to project an image from the second set on to the beam splitter. The actors and props on the second set are then positioned to achieve the desired scale. For example, the projected image of the actor may be life size, smaller than life size or larger than life size. The actor is then filmed in real time interacting with the blacked out second set props and the image is recorded. The recorded image is then played back on the monitor and reflected onto the beam splitter to give the illusion that the recorded image is interacting with the props in a three dimensional set. The actor's image may be projected onto the beam splitter in real time, without the use of a recording device, if desired.

DETAILED DESCRIPTION OF THE PRESENT INVENTION

A method and apparatus for combining a projected recorded or live image with a three dimensional set in which the projected image is registered with specific items in the three dimensional set is described. In the following description, numerous specific details are set forth, such as number of monitors, beam splitter angle, etc., in order to provide a more thorough understanding of the present invention. It will be obvious, however, to one skilled in the art, that the present invention may be practiced without these specific details. In other instances, well known features have not been described in detail in order not to unnecessarily obscure the present invention.

In the following description, the present invention and various embodiments are described in which reference is made to the projecting of an actor's image in combination with a three dimensional set. Such description is, by way of example only, and is not a limitation on the scope of the present invention. It will be understood that any image, moving or still, live, inanimate or animated or any combination thereof, may be utilized in combination with a three dimensional set with the method of the present invention.

Figure 1:
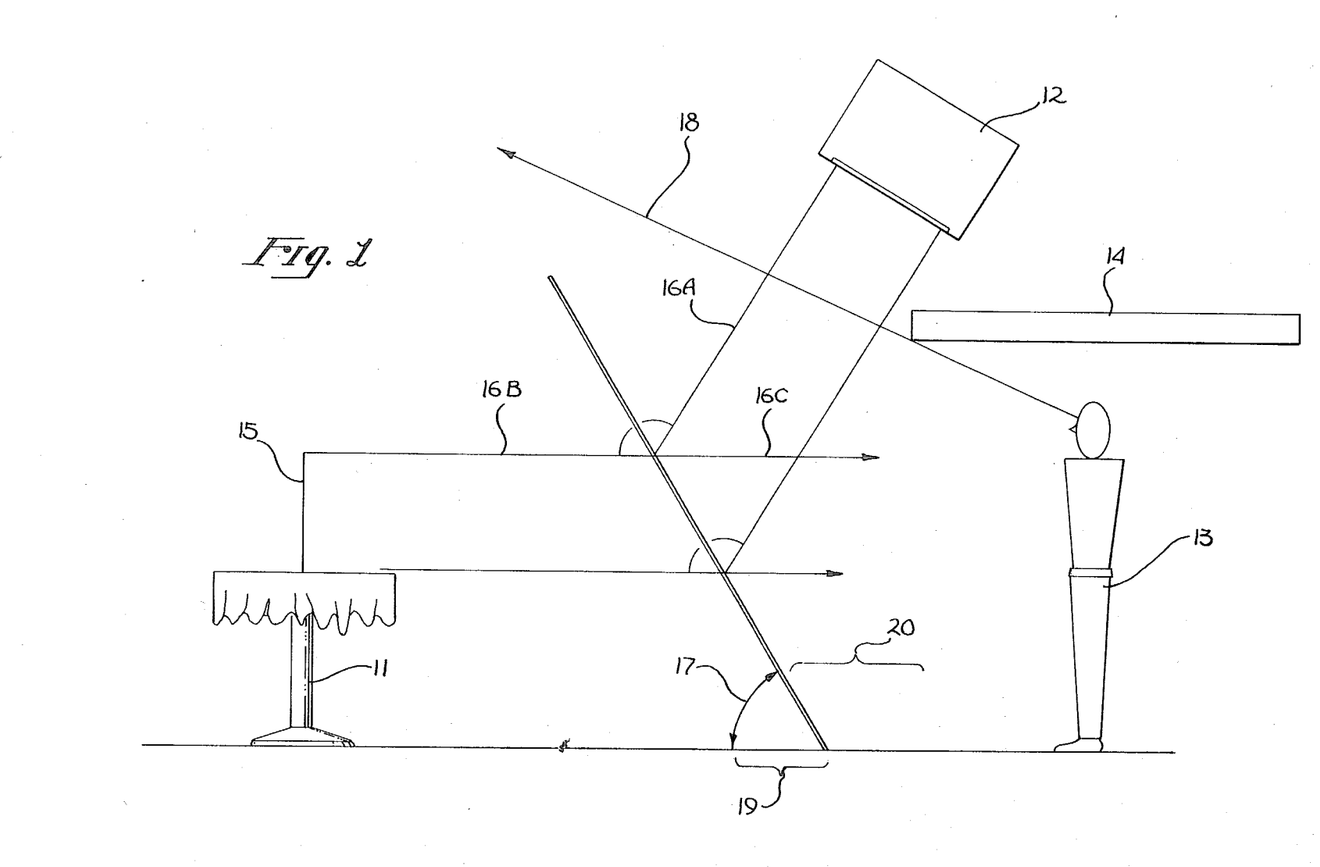
FIG. 1 is a side view of the apparatus of the present invention in combination with a life size scale three dimensional set.

FIG. 1 illustrates an embodiment of the present invention in which a life size scale three dimensional set is utilized. The perspective of the audience is shown by the viewer 13. The illusory effect of the present invention is maximized when the viewer 13 is substantially head on to the three dimensional set.

As shown in FIG. 1, the three dimensional set includes a table 11. The viewer 13 is separated from the table 11 by a sheet of float glass 10 which acts as a beam splitter. The glass 10 is coated so that it acts as a two way mirror. In other words, an image reflected onto the face of the beam splitter 10 nearest the viewer 13 will be reflected to the viewer while images behind the beam splitter 10 such as the table 11, will be transmitted through the beam splitter to the viewer 13. The lighting on each side of the beam splitter 10 is balanced so that the three dimensional set will appear to have the same illumination as the reflected image.

The beam splitter 10 is shown at an angle 17 of approximately 60 degrees. The angle 17 may be any suitable angle for reflecting an image to the viewer 13. However, once selected, the angle of the beam splitter 10 remains fixed. A monitor or other image projecting device 12, projects a recorded or live image onto the beam splitter 10. Th image, represented by line 16A, is reflected to the viewer 13 as shown by line 16C. However, the image seen by viewer 13 is an apparent image 15, shown by line 16B, which is at the same distance from the beam splitter 10 as the monitor is from beam splitter 10. The position of the monitor 12 is chosen so that the apparent image may be made to appear to be coincident with the 3-D set. In this case, the apparent image is made to appear resting on top of the table 11. To further enhance the illusory effect, a baffle 14 is used to mask the presence of the monitor from the viewer 13. Thus, as shown by line 18, (the upper most line of sight), the viewer is unable to see the monitor 12 as a result of the baffle 14.

The beam splitter 10 in the present invention is tinted to increase the contrast of the reflected image and to aid in combining the reflected image and the 3-D set image. The tinting also aides in eliminating a double image being reflected from the beam splitter. The double image is due to the projected image reflecting off the front and back surface of the glass simultaneously. By tinting the glass, such as with a plastic coating (e.g., titanium sputter) or providing a partially silvered glass, this double imaging can be eliminated. The result of the tinting or silvering is that of a two way mirror. The effect of the illusion may also be enhanced by using prop sections that can be made to appear at areas 19, behind the beam splitter 10, and area 20, in front of the beam splitter 10 so that the boundary of the three dimensional set does not appear to coincide with the beam splitter 10.

Figure 2:
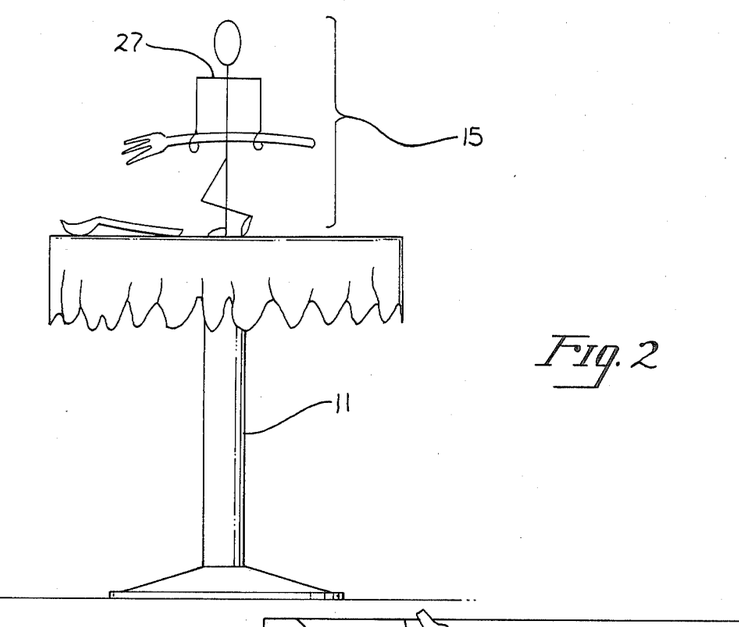
FIG. 2 is a front view of the embodiment of FIG. 1, shown from the viewer's perspective.

The combined image shown as being seen by a the viewer 13 is illustrated in FIG. 2. The projected and reflected image, (in this case a man holding a large prop fork), is seen to be on top of the table 11. By manipulating the projected image, the man may be made to disappear, or move about on the table 11. In this instance, the scale was selected to create an illusion in which the table appears to be full size and the projected image appears to be that of a minature man, although a full sized actor was used to manufacture the image.

Figure 3:
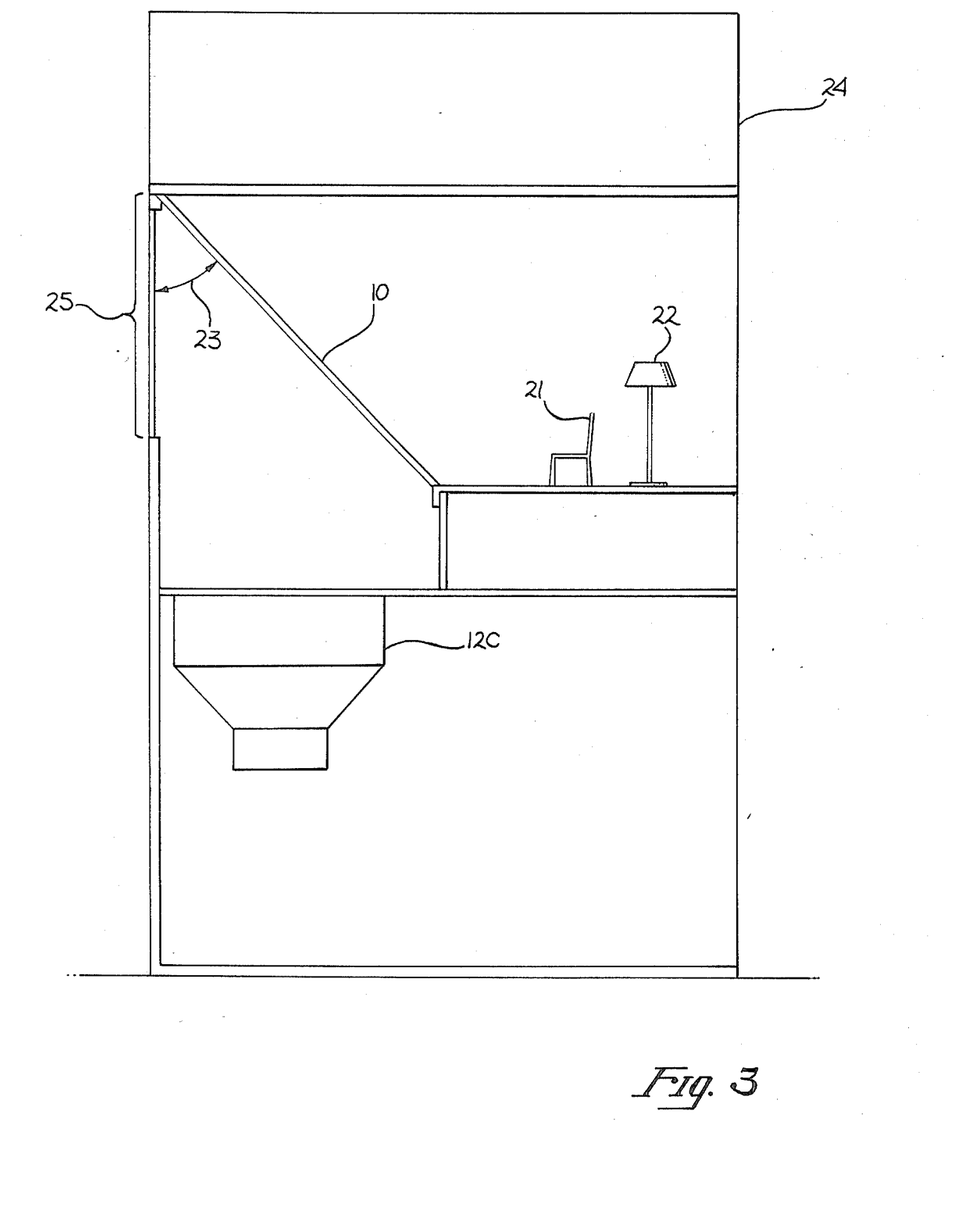
FIG. 3 is a side view of the apparatus of the present invention in combination with a small scale three dimensional set, enclosed for portability.

FIG. 3 illustrates an alternate embodiment of the present invention in which a minature set is utilized. The minature set includes a chair 21 and lamp 22. The minature set is enclosed in a cabinet 24 which is designed for portability. A monitor 12C is in a fixed location in the cabinet 24 so that the entire apparatus may be moved without effecting the distance between the monitor and the beam splitter 10. In this instance, the beam splitter 10 is angled towards the viewing area 25 at an angle 23 of approximately 45 degrees. A front view of this alternate embodiment is illustrated in FIG. 4.

Figure 4:
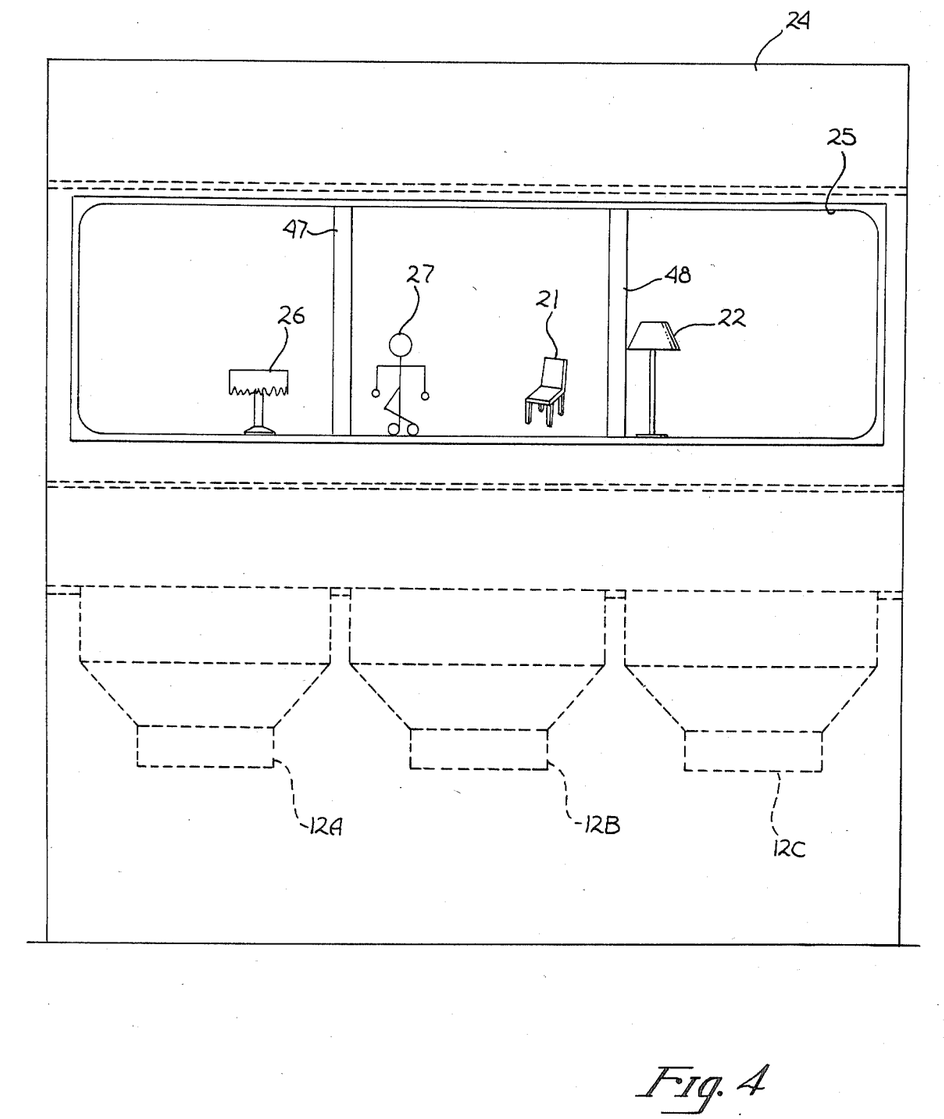
FIG. 4 is a front view of FIG. 3.

As shown in FIG. 4, a plurality of monitors 12A, 12B and 12C may be utilized with a wide set area and a large beam splitter to provide greater viewing area. A projected image of a man 27 may interact with the set pieces such as table 26, chair 21 or lamp 22. With multiple projector embodiments as shown in FIG. 4, a monitor which is not currently projecting an image is coupled to a black generator so that no image from that monitor will be reflected on to the beam splitter 10. In this manner, the viewer will not notice the presence of the monitors during the display. If the projected image is a recorded image such as for example, on a laser disc, the laser disc can generate a black screen without the need for a separate black generator. In addition, the actor's image may be projected live onto the beam splitter 10. In this instance, separate cameras may be coupled to each of the plurality of monitors. In this situation, a black background is used so that, unless the actor appears in the camera's line of sight, a black image will be projected onto the beam splitter 10. The projected figure 27 is generated from monitor 12B in the position shown in FIG. 4. To move the figure 27 to the left, the image would have to appear on monitor 12A. If the figure 27 were moved to the right, the image would be generated on monitor 12C. In the present invention, any number of monitors may be utilized with a beam splitter to provide a plurality of images and image manipulation. For example, monitors may be stacked above each other to give the illusion of a figure climbing or floating upwards.

Because there are gaps between the monitors, an image of a character "walking" from one monitor onto another will disappear for the space of that gap. In order to minimize the jarring effect this may have on an audience, and to maintain the illusion of reality, set pieces on the three dimensional set may be incorporated to coincide with the gaps between the monitors. For example, as shown in FIG. 4, partitions 47 and 48 aare made part of the three dimensional set and coincide with the gaps between monitors 12a and 12b and monitors 12b and 12c respectively. The partitions 47 and 48 may take the form of walls, bookcases, or any other desirable form.

The size of the viewing area is limited by the size of the beam splitter. A larger beam splitter permits greater viewing area. It is not necessary to utilize a plurality of monitors in order to be able to project images on all areas of a large beam splitter. In an alternate embodiment of the present invention, a single monitor or other image projecting device may be disposed on tracks, and its movement coordinated with movement of a projected image. The tracked monitor may move in an XY direction concurrently with movement of the projected image so that the projected image may appear anywhere on the beam splitter. Thus, the gaps created by multiple monitor arrangements are eliminated.

Such tracked monitors may be computer controlled. For example, a time code on a recorded image could be inputted to a computer. A computer could then control current 50 to a stepper motor 49 coupled to the tracked monitor (see FIG. 6). The computer could then control movement of the tracked monitor on the basis of the time code of the recorded image.

A tracked monitor may also be utilized with a projected live image and a stepper motor may be manually controlled to coordinate movement of the monitor with movement of the live projected image.

Figure 5:
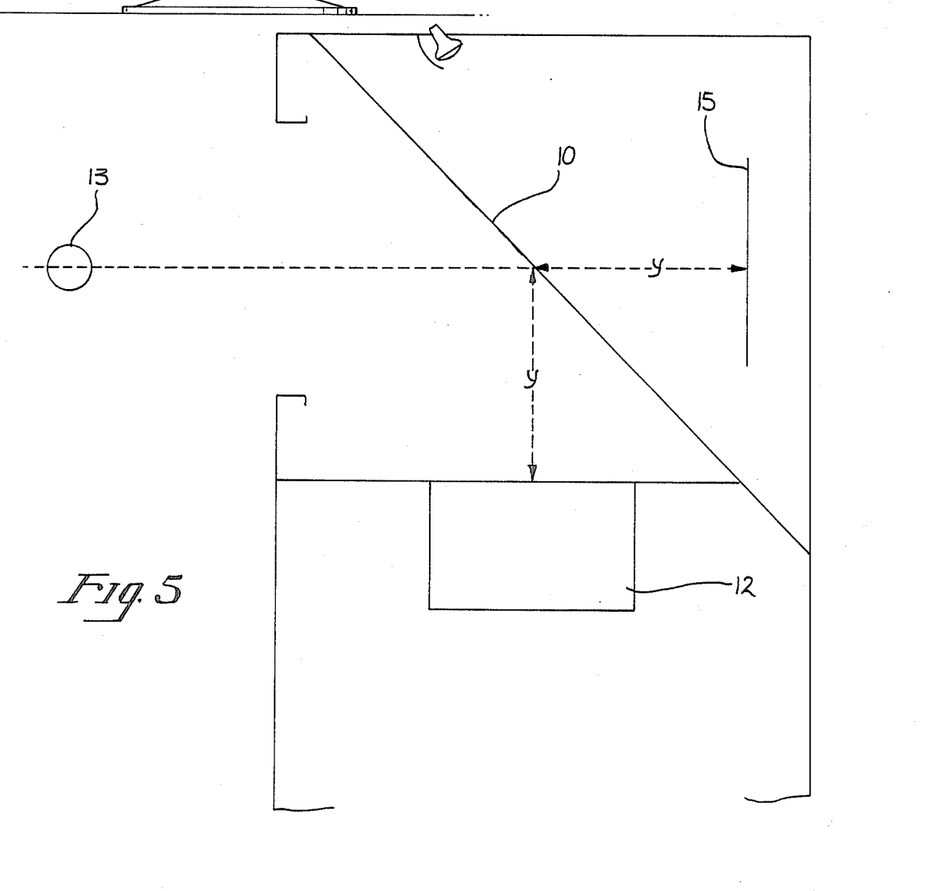
FIG. 5 is a top view of an alternate embodiment of the present invention.

Although the embodiments thus far discussed have utilized beam splitters at an angle to the vertical with respect to the viewer, the beam splitter may be placed at an angle with respect to the horizontal to the viewer as well. As illustrated in FIG. 5, a top view of the apparatus of the present invention, the beam splitter 10 is placed at a 45 degree angle to the horizontal with respect to the viewer 13.

As with the previously discussed embodiments, the monitor 12 is kept out of sight of the viewer 13. An image from the monitor 12 is projected on to the beam splitter 10 and is reflected at right angles to the viewer 13. The viewer sees an apparent image 15 which appears to be on the three dimensional set behind the beam splitter 10. Stage lighting is employed to illuminate the three dimensional stage set so that the brightness of the set as seen by the viewer through the beam splitter 10 may be matched with that of the projected image. As previously noted, the angle of the beam splitter may be varied for different applications. However, the angle must be the same during preparation of the recorded image and subsequent display. The reason for this will be explained during the discussion of real time matting below.

Figure 7:
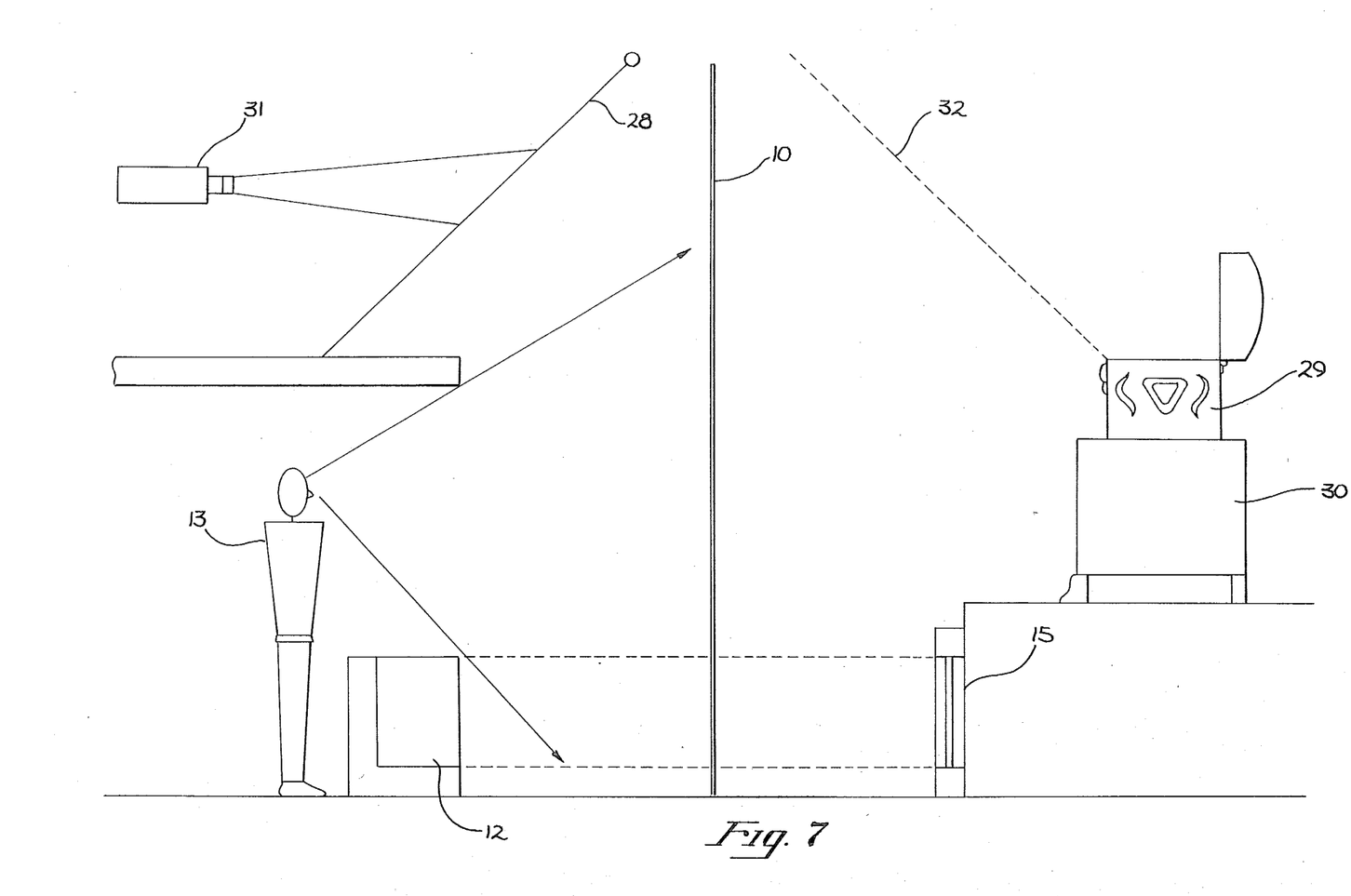
FIG. 7 is a side view of an alternate embodiment of the present invention.

The beam splitter 10 may also be placed perpendicular to the line of sight of the viewer 13. As shown in FIG. 7, an image from a rear projection screen 28 is reflected on to the perpendicularly placed beam splitter 10. The image on the rear projection screen may come from any suitable source, such as a slide projector, film projector, video or laser disc monitor or may be a projected live image. The resulting apparent image 32 appears to come up and towards the viewer 13. This effect can be combined with a hidden TV monitor 12 which provides a planar apparent image 15 to the viewer 13. In the embodiment shown in FIG. 7, a life size set including a chest 29 and table 30 is utilized.

Figure 8:
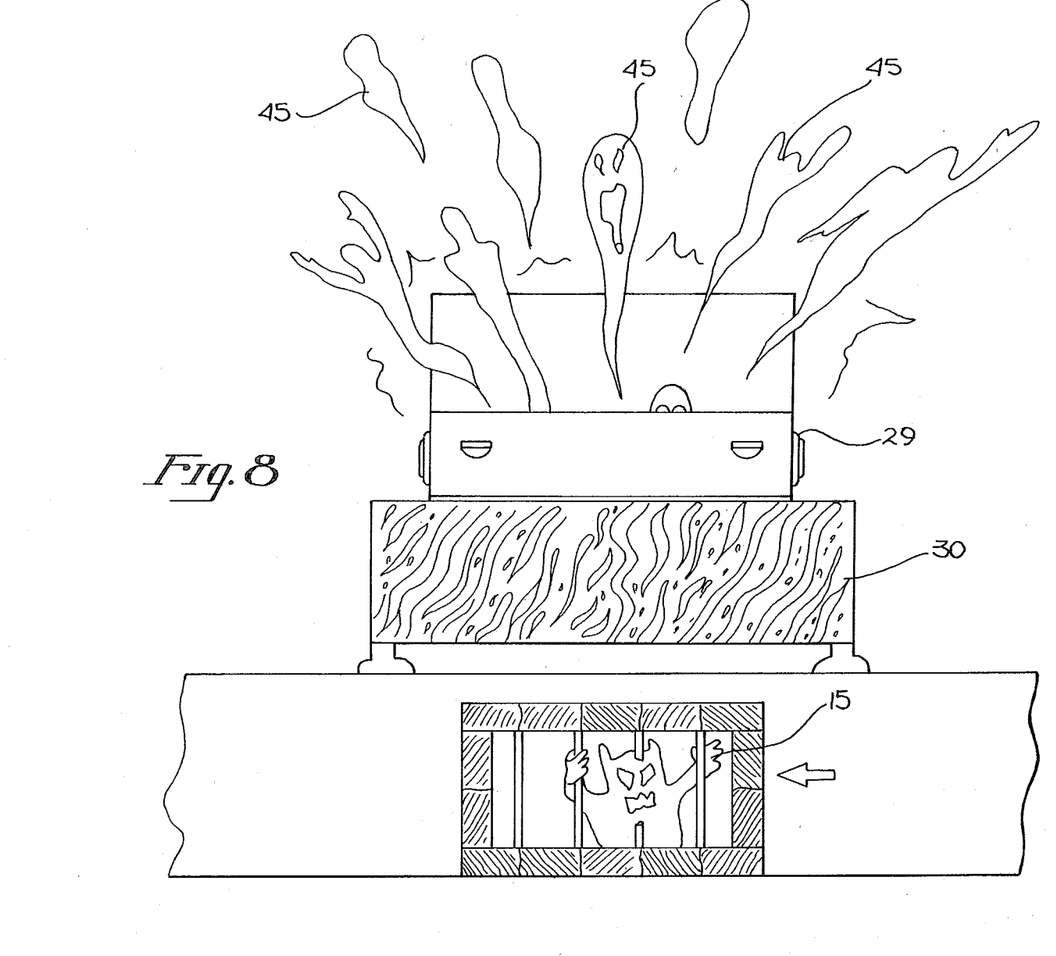
FIG. 8 is a front view of the embodiment of FIG. 7.

In FIG. 8, a front view of the embodiment of FIG. 7 is shown. In this example, the apparent image 15 from TV monitor 12 is that of a demon figure and is made to appear as if behind bars in the three dimensional set. The rear projection screen 28 provides the images of the ghosts 45. Because of the placement of the rear projection screen 28 and the beam splitter 10, the ghosts 45 appear to rise out of the chest 29 and move toward the viewer as they rise. The ghost images follow the plane of line 32 of FIG. 7.

Figure 6:
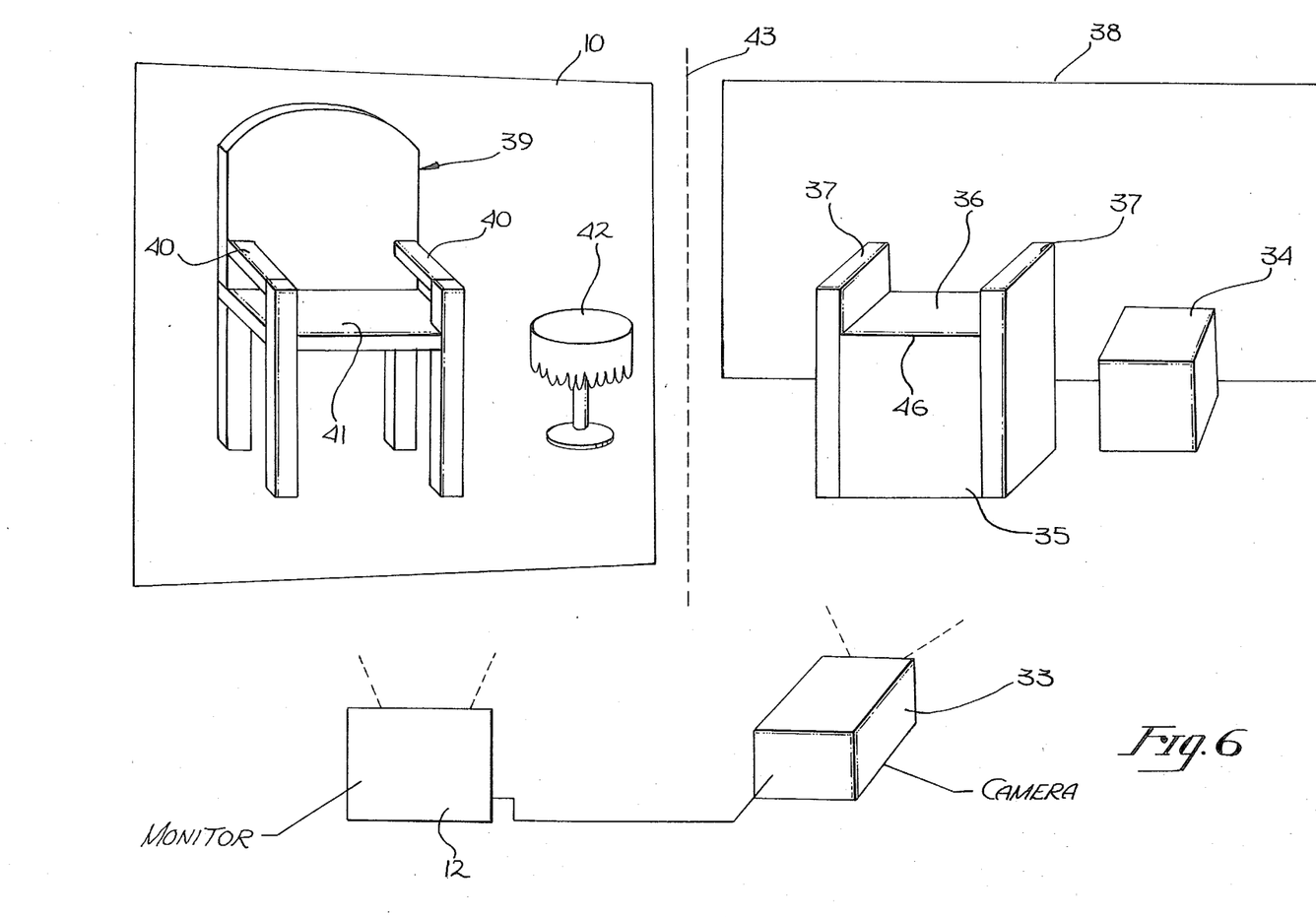
FIG. 6 is a front view of the present invention illustrating the method of providing real time matting of recorded or live images with a three dimensional set.

The method of providing real time matting of projected images with three dimensional sets is illustrated in FIG. 6. In the example shown in FIG. 6, a three dimensional set comprising a chair 39 and table 42 for example is shown. In this instance, it is desired to combine the three dimensional set with a projected image of an actor who will interact with the seat 41 and arms 40 of the chair 39, and with an object which will appear to be resting on the table 42. The three dimensional set may be of any scale desired, as the real time matting method of the present invention may be advantageously employed with any size set.

The set is fronted with a beam splitter 10, shown in FIG. 6 at an angle to the horizontal with respect to the set. The angle of the beam splitter 10 may be any angle desired, but once chosen, remains fixed through the matting process and in the eventual display. A monitor 12 or other image projecting device is positioned facing the beam splitter 10 on the side opposite the three dimensional set. The angle of the monitor 12 to the beam splitter 10 in FIG. 6 is chosen so that the projected image will be reflected to the desired viewing area of the display. This angle must be kept constant during the real time matting of the projected image with the three dimensional set and in the actual display.

The positioning of the monitor 12 is chosen so that it may be hidden from view from the audience but still provide adequate imaging to the beam splitter 10. As previously noted, the distance of the apparent image behind the beam splitter 10 is equal to the distance between the monitor 12 and the beam splitter 10. Referring briefly to FIG. 1, this effect is shown by line 16B representing the distance of the apparent image from the beam splitter 10, which is equal in length to line 16A, representing the distance between the monitor 12 and the beam splitter 10.

Referring again to FIG. 6, a second stage is provided which is used to effectuate the real time matting of the projected image on to the three dimensional set. The second stage utilizes props to represent the set pieces of the three dimensional display set. The props 34 and 35 correspond to the table 42 and chair 39 respectively. It is not necessary for the props to be exact duplicates of the set pieces. However, the surfaces of the set pieces with which the projected image will interact must be represented by the props. For example, as previously noted, it is desired to have an actor interact with the arms 40 and seat 41 of the chair 39 of the three dimensional set. Thus, the prop 35 includes arms 37 and set 36 which may be utilized by an actor on the second set. Likewise, the surface of prop 34 corresponds to the surface of table 42. It is to be noted that in FIG. 6, the props 34 and 35 are not drawn to scale with the table 42 and chair 39. As previously mentioned, the three dimensional set may be of any desired scale. The actual size of the props is dependent on the desired relationship of the actors projected image with respect to the three dimensional set. For example, if it is desired to project an actors image in which the image appears to be half the size of the chair 39, then the prop 35, representing the chair 39, or a section of chair 39 be positioned accordingly to create such an image.

A camera 33 is employed on the second set to transmit the actor's image to a recorder or directly to the monitor 12. The camera 33 is locked in a fixed position. The camera will remain in this fixed position during recording of the moving images to be projected onto the beam splitter 10. The camera 33 will also remain in place if a live image is to be projected onto the beam splitter.

To properly align the second set props, the actors "working area" is determined. This is done by having the actor interact with a prop on the second set and transmitting that image onto the beam splitter 10. For example, the actor may place his hand on prop 34, corresponding to table 42 of the three dimensional set. By moving the prop 34 toward or away from the camera as required, the projected image of the top surface of the prop 34 may be made to match that of set piece 42. The actor then interacts with an edge of prop 34 and prop 34 is moved from left to right so that the edge of prop 34 may be aligned with the edge of table 42. The same process is repeated for prop 36, corresponding to chair 39 of the three dimensional set.

This process is repeated for any other props and set pieces which may be involved in the ultimate displayed image. Once this critical alignment of props and actor is complete, the remainder of the actor's "working area" may be defined. Because of the inherent properties of a lensed camera, a movement of the actor forward or backward (away from the camera) will cause his projected image to grow or shrink respectively. Hence, the actor is limited to move perpendicular to the camera in order to maintain his scale in the projected image. If a scale changing is desired or specified, the actor may then move forward or backward with respect to the camera to effectuate that scale change.

All objects on the second set, other than those which are to appear in the projected image, must be masked so as to be rendered invisible to the camera. In the preferred embodiment of the present invention, this is accomplished by covering each of the prop items with duvytine. Duvytine is a black substance and is substantially undetected by a camera. The second set includes a background 38 which is covered with duvytine or other suitable masking substance, and the floor is covered with duvytine as well. The props 34 and 35 may be covered with duvytine or covered or draped with duvytine material so as to render them invisible to the camera. Although duvytine is used in the preferred embodiment of the present invention, other suitable masking substances may be utilized, such as black velvet or velour. In addition, the CHROMAKEY process utilizing any suitable color may be utilized as well. Initially, the monitor size is chosen to enable the correct scale of the projected image to be achieved in the three dimensional set. For example, if the character to be projected is to be six feet tall, a monitor or other image projector capable of projecting an image six feet tall is required. TV monitors are typically employed in the preferred embodiment of the present invention for characters up to twenty inches in height. Rear projection screens may be utilized for larger characters.

Once the screen size is chosen, the monitor or projector is put in place, as previously mentioned. The actor is then filmed or taped on the second stage and his image is projected on to the beam splitter 10 of the three dimensional set. A spotter, who assists in correctly positioning the actor, is positioned in the same location as the audience for the eventual display presentation.

The actor moves on stage until his apparent image appears next to an object on the three dimensional set. For example, the actor is moved until his image appears next to the front edge of the seat 41 of the chair 39. As previously noted, the prop 35 is then positioned so that the front edge 46 of the prop 35 coincides with the front edge of the chair seat 41. This may be easily achieved by use of reflective tape applied to the front edge 41 of prop 35. This tape can then be removed or covered after positioning of the prop so that the prop will disappear during subsequent filming. The reflective tape allows the prop edge to be seen in the beam splitter 10 during positioning.

This process may be repeated for the other set pieces in the three dimensional set until each prop on the second stage corresponds positionally to a set piece on the three dimensional set. At this time, the actor may move from prop to prop freely, without the need for stop action photography or detailed calibration and correlation of the reflected image with the three dimensional set. When the image of the actor interacting with the props on the second set is projected onto the beam splitter 10, the actor's apparent image will appear to be interacting with the three dimensional set pieces.

The projected image may be recorded and played back on a playback device such as a video tape machine, laser disk player, film projector, or other suitable means, and reflected on to the beam splitter of a three dimensional set. It is also possible, once the working area of the actor is determined, to project the actors image in real time on to the beam splitter of the three dimensional set. This allows the real time matting of the actors image to the three dimensional set. By utilizing a live transmission of an actors image, the actors image may interact with members of the audience or in response to audience reaction. However, none of the special effects capabilities made possible by the present invention are lost. The use of a live actor adds to the realism of the display presentation. For example, with the projected image of the actor is in miniature scale, and yet the actors image interacts in real time with the audience, the belief that the miniature person is "real" is heightened.

Special effects can be easily implemented using the method of the present invention. For example, a blacked out curtain may be placed in front of an actor on the second set and slowly raised so that the actors projected image on the beam splitter appears to take form from the floor up. Similarly, the technique could be applied to inanimate objects as well. In addition, the recording medium could be stopped at selected points, with objects or actors then added to the second set prior to resuming recording. These objects or actors would then seem to suddenly appear in the recorded scene.

In other embodiments of the present invention, a second beam splitter may be utilized in front of the camera so that different images can be combined while recording or transmitting the actor's image. For example, optical fibers may be utilized and disposed in a desired pattern. The optical fibers are combined through the second beam splitter with an actors image. This combined image is projected onto the first beam splitter so that the projected actors image appears to be covered with the light pattern. This technique can of course be applied to inanimiate objects as well.

In another embodiment of the present invention, set pieces on the three dimensional set may be animated by manual or automatic activation so that it may appear that the projected image is "moving" the set piece. For example, referring to FIG. 4, it may be desired to have the projected image 27 appear to pull the chair 21 away from table 26 and then sit in the chair. The chair 21 could be coupled to a motorized arm or a track assembly and moved in coordination with the movement of the projected image 27. If the image 27 was generated from a recording device, the time code signal from the recording or playback device could be utilized by a computer to activate a stepper motor and provide movement of chair 21 in coordination with the time code. If the live transmission of an actors image 27 were desired, movement of the chair could be manually activated so that the projected image 27 appeared to move the chair itself.

It is not necessary that such animated three dimensional set pieces only be moved in response to direct action by the projected image 27. For example, it may be desired to have the set pieces move on their own or in response to some other action and then have the projected image 27 interact with the set piece in a new position. In such instances, a prop on the second set corresponding to the original and new position of a set piece on the three dimensional set must be provided.

Although the present invention has been discussed with respect to the projection of images of live actors or other odd objects onto a three dimensional set, it will be obvious that animated images may be projected on to the three dimensional set either alone or in combination with "live" images.

Thus, a unique method and apparatus for superimposing projected images onto a three dimensional display has been described.

We claim:

1. A method of providing coordinated superimposition of images in a visual display comprising the steps of:
   providing a first set, said first set comprising a plurality of three dimensional set pieces of a user determined scale;
   providing a second set, said second set comprising a plurality of props, each of said props corresponding to one of said set pieces;
   providing a projection device for projecting images, said projection device disposed facing said first set;
   disposing a beam splitter between said first set and said projection device, said beam splitter transmitting the image of said first set and reflecting images from said projecting device;
   masking said props on said second set so as to be invisible when projected on to said beam splitter;
   transmitting moving images from said second set interacting in real time with said props to said projecting device, said projecting device projecting said moving images on said beam splitter to produce an apparent image, wherein said apparent image appears to interact with said set pieces;
   whereby a combination of a projected image with a three dimensional set may be provided.

2. The method of claim 1 wherein said moving images are created by the movement of an actor on said second stage.

3. The method of claim 1 further including the steps of projecting an image of said second set on to said beam splitter and positioning said props on said second set to coincide with said set pieces on said first set.

4. The method of claim 1 further including the step of disposing a second beam splitter between a second set and said recording device, said beam splitter transmitting images from said second set and reflecting images from a second image source, recording a combined image of said second set and said second image source and projecting said combined image on said first beam splitter.

5. The method of claim 1 wherein said moving images are recorded and said recorded images are transmitted to said projecting device, said projecting device projecting said recorded images on to said beam splitter to produce an apparent image, wherein said apparent image appears to interact with said set pieces.

6. The method of claim 1 further including the step of animating said set pieces so that the movement of said set pieces may be coordinated with said moving image.

7. The method of claim 1 wherein said projection device is coupled to a motor for movement in an imaginary X-Y coordinate plane, said motor coupled to a control signal, said control signal controlling the movement of said projection device in said X-Y plane.

8. The method of claim 7 wherein said control signal is generated manually.

9. The method of claim 7 wherein said control signal is generated automatically in response to a predetermined pattern.

10. The method of claim 7 wherein said control signal is generated in response to a time code accompanying the projection of said moving image.

11. A method of providing coordinated superimposition of images in a portable visual display comprising the steps of:
    providing a first set, said first set comprising a plurality of three dimensional set pieces of a user determined scale;
    providing a cabinet for containing said first set, said cabinet including an opening for viewing said first set;
    disposing a monitor in said cabinet;
    providing a beam splitter disposed in said cabinet between said first set and said monitor, said beam splitter transmitting the image of said first set through said opening and reflecting images projected from said monitor through said opening;
    providing a second set, said second set comprising a plurality of props, each of said props corresponding to one of said set pieces;
    masking said props on said second set so as to be invisible when projected on to said beam splitter;
    generating moving images interacting with said props on said second set, transmitting said moving images to said monitor;
    said monitor projecting said moving images on said beam splitter, producing an apparent image, wherein said apparent image appears to interact with said set pieces;
    whereby a coordinated superimposed image may be provided in a portable display.

12. The method of claim 11 wherein said moving images are created by the movement of an actor on said second set.

13. The method of claim 11 further including the steps of projecting an image of said second set on to said beam splitter and positioning said props on said second set to coincide with said set pieces on said first set.

14. The method of claim 11 further including the step of disposing a second beam splitter between said second set and said recording device, said beam splitter transmitting images from said second set and reflecting images from a second image source, recording a combined image of said second set and said second image source and projecting said combined image on said first beam splitter.

15. The method of claim 11 wherein said moving images are recorded and said recorded images are transmitted to said monitor, said monitor projecting said recorded images on to said beam splitter to produce an apparent image, wherein said apparent image appears to interact with said set pieces.

16. The method of claim 11 further including the step of animating said set pieces so that the movement of said set pieces may be coordinated with said moving image.

17. Apparatus for providing coordinated superimposed images in a visual display, said apparatus comprising:
    a first set, said first set comprising a plurality of three dimensional set pieces of a user determined scale;
    a projecting device for projecting moving images, said projecting device disposed facing said first set;
    a beam splitter disposed between said first set and said projecting device, said beam splitter transmitting the image of said first set and reflecting images projected from said projecting device;
    a playback device coupled to said projecting device, said playback device for playing back recorded images on said projecting device, said recorded images obtained by recording moving images in real time on a second set, said second set comprising a plurality of props, each of said props corresponding to one of said set pieces, said props masked so as to be invisible to said recorder, said recorded images reflecting from said beam splitter and creating an apparent image, said apparent image appearing to interact with said set pieces;
    whereby a combined recorded image and three dimensional image may be achieved.

18. The apparatus of claim 17 wherein said projection device is coupled to a motor for movement in an imaginary X-Y coordinate plan, said motor coupled to a control signal, said control signal controlling the movement of said projection device in said X-Y plane.

19. The apparatus of claim 18 wherein said control signal is generated manually.

20. The apparatus of claim 18 wherein said control signal is generated automatically in response to a predetermined pattern.

21. The apparatus of claim 18 wherein said control signal is generated in response to a time code accompanying the projection of said moving image.

22. A method of providing coordinated superimposition of images in a visual display comprising the steps of:
    providing a first set, said first set comprising at least one three dimensional set piece of a user determined scale;
    providing a stage of user determined size for containing said first set, said stage including an opening for viewing said first set;
    disposing a monitor in said stage;
    providing a beam splitter disposed in said stage between said first set and said monitor, said beam splitter transmitting the image of said first set through said opening and reflecting images projected from said monitor through said opening;
    providing a second set, said second set comprising at least one prop, said prop corresponding to said set piece;
    masking said prop on said second so as to be invisible when projected on to said beam splitter;
    generating moving images interacting with said prop on said second set, transmitting said moving images to said monitor;
    said monitor projecting said moving images on said beam splitter, producing an apparent image, wherein said apparent image appears to interact with said set piece;
    disposing a recording device in said stage;
    whereby a coordinated superimposed image may be provided in a visual display.

23. The method of claim 22 wherein said moving images are created by the movement of an actor on said second stage.

24. The method of claim 22 wherein said moving images are artificially generated images.

25. The method of claim 23 further including the steps of projecting an image on said second set on to said beam splitter and positioning said prop on said second set to coincide with said set piece on said first set.

26. The method of claim 22 further including the step of disposing a second beam splitter between said second set and said recording device, said beam splitter transmitting images from said second set and reflecting images from a second image source, recording a combined image of said second set and said second image source and projecting said combined image on said first beam splitter.

27. The method of claim 22 wherein said moving images are recorded and said recorded images are transmitted to said monitor, said monitor projecting said recorded images on to said beam splitter to produce an apparent image, wherein said apparent image appears to interact with said set piece.

28. The method of claim 22 further including the step of animating said set piece so that the movement of said set piece may be coordinated with said moving image.

29. The method of claim 11 wherein said moving images are created by the real time movement of an actor on said second set and said moving images are transmitted in real time to said monitor.

30. The method of claim 16 wherein said set pieces are animated in respoonse to a time code accomapnying the projection of said moving image.

* * * * *